(12) United States Patent
Oh

(10) Patent No.: US 12,187,350 B2
(45) Date of Patent: Jan. 7, 2025

(54) VEHICLE STEERING APPARATUS

(71) Applicant: HYUNDAI MOBIS CO., LTD., Seoul (KR)

(72) Inventor: Young Gi Oh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/380,386

(22) Filed: Oct. 16, 2023

(65) Prior Publication Data

US 2024/0140519 A1 May 2, 2024

(30) Foreign Application Priority Data

Nov. 1, 2022 (KR) .......................... 10-2022-0144041

(51) Int. Cl.
*B62D 3/10* (2006.01)

(52) U.S. Cl.
CPC ...................................... *B62D 3/10* (2013.01)

(58) Field of Classification Search
CPC ......... B62D 3/10; B62D 5/0409; F16C 27/00; F16H 55/22
See application file for complete search history.

(56) References Cited

U.S. PATENT DOCUMENTS

| | | | |
|---|---|---|---|
| 2010/0243367 A1* | 9/2010 | Suzuki | F16H 57/022 180/444 |
| 2015/0107384 A1* | 4/2015 | Kwon | B62D 5/0409 74/89.14 |
| 2018/0216720 A1* | 8/2018 | Kim | F16H 57/021 |

FOREIGN PATENT DOCUMENTS

| | | | |
|---|---|---|---|
| DE | 102017123142 A1 * | 4/2019 | |
| KR | 10-2167914 B1 | 10/2020 | |
| KR | 102208240 B1 * | 1/2021 | |

OTHER PUBLICATIONS

Translation of KR-102208240-B1; Jan. 28, 2021 (Year: 2021).*
Translation of DE-102017123142-A1; Apr. 11, 2019 (Year: 2019).*

* cited by examiner

*Primary Examiner* — Paul N Dickson
*Assistant Examiner* — Shams Dhanani
(74) *Attorney, Agent, or Firm* — Morgan, Lewis & Bockius LLP

(57) ABSTRACT

The present disclosure relates to a vehicle steering apparatus, the vehicle steering apparatus includes a main housing; a worm shaft rotatably disposed on the main housing; a worm wheel meshed with the worm shaft; a bearing disposed on the worm shaft; an elastically deformable guide surrounding an outer surface of the bearing and disposed within the main housing; and a pressing part extending through the elastically deformable guide to be in contact with the bearing and configured to press the worm shaft toward the worm wheel.

9 Claims, 6 Drawing Sheets

VEHICLE STEERING APPARATUS

CROSS-REFERENCE TO RELATED APPLICATION

This application claims the benefit under 35 U.S.C. § 119(a) of priority to Korean Patent Application No. 10-2022-0144041, filed on Nov. 1, 2022 in the Korean Intellectual Property Office, the entire disclosure of which is incorporated herein by reference for all purposes.

BACKGROUND

Field

Exemplary embodiments of the present disclosure relate to a vehicle steering apparatus and, more particularly, to a vehicle steering apparatus configured to reduce noise and vibrations by absorbing the vibrations of a bearing.

Discussion of the Background

A reducer of a column-type motor driven power steering (C-MDPS) supports bearings, and is manufactured by double injection of plastic and rubber.

In the related art, the C-MDPS is configured such that an outer portion of a bearing guide is formed of plastic and an inner portion of the bearing guide is formed of rubber. Alternatively, in the C-MDPS, an inner portion of a bearing guide is formed of plastic and an outer portion of the bearing guide is formed of rubber. The plastic portion holds the bearing in position, and the rubber portion suppresses noise and vibrations by absorbing vibrations.

In the related-art C-MDPS configured as above, dimensions that determine the positions of components are affected by the cumulative tolerance of each of the plastic and rubber components, thereby increasing the position distribution of the bearing that determines the position of the reducer.

In order to overcome this problem, the bearing guide is required to be fixed to a housing surrounding the bearing guide. For this fixing, the bearing guide is required to be fitted to the inner surface of the housing loosely or by interference fitting.

In the case of an interference fitting, a space in which the bearing is tilted may be reduced thus interfering with the tilting motion of the bearing, thereby increasing frictional force. In the case of a loose fitting, the bearing guide may not be fixed to the housing, so that rattling noise may occur due to shaking during driving on a narrow road. Accordingly, there is a demand to improve this problem.

The background technology of the present disclosure is disclosed in Korean Patent No. 10-2167914 (registered on Oct. 14, 2011 and entitled "Vehicle Steering Apparatus").

SUMMARY

Various embodiments are directed to a vehicle steering apparatus enabling a bearing guide to be reliably fitted to a housing by removing an assembly tolerance occurring during fitting the bearing guide to the housing.

A vehicle steering apparatus according to the present disclosure may include: a main housing; a worm shaft rotatably disposed on the main housing; a worm wheel meshed with the worm shaft; a bearing disposed on the worm shaft; an elastically deformable guide surrounding an outer surface of the bearing and disposed within the main housing; and a pressing part extending through the guide to be in contact with the bearing and configured to press the worm shaft toward the worm wheel.

The guide may include: a guide body disposed within the main housing and surrounding an outer surface of the bearing; a through-hole extending through the guide body and allowing the pressing part to be inserted thereinto; and a plurality of guide protrusions protruding from the guide body in a circumferential direction of the guide body to be in contact with an inner surface of the main housing.

The guide protrusions may be elastically deformed by contact with the inner surface of the main housing.

The guide may further include stepped protrusions disposed on the guide body to be spaced apart from the guide protrusions and in contact with the inner surface of the main housing.

One end of each of the guide protrusions may be in contact with an edge portion of the guide body.

The maximum outer diameter of the stepped protrusions may be greater than the inner diameter of the main housing.

The plurality of stepped protrusions may be disposed on the guide body in a circumferential direction of the guide body to be spaced apart from each other predetermined distances.

The pressing part may include: a pressing rod extending through the through-hole to press the bearing; a spring configured to elastically support the pressing rod; and a pressure control portion movably disposed on the main housing and in contact with the spring.

The guide body may be ring-shaped.

The guide may include a plastic material.

The bearing may include: a bearing body disposed on one end of the worm shaft and disposed within the guide; and O-ring portions disposed on an outer surface of the bearing body and include an elastically-deformable material.

The plurality of O-ring portions may be disposed on an outer surface of the bearing body to be spaced apart from each other.

In the vehicle steering apparatus according to the present disclosure, the guide may be reliably fitted to the main housing to absorb vibrations of the bearing, thereby reducing noise and vibrations.

According to the present disclosure, when the guide is the same as or greater than the inner diameter of the main housing due to the guide protrusions or the stepped protrusions, it is possible to absorb the tolerance distribution, thereby realizing a reliable function.

DETAILED DESCRIPTION OF THE ILLUSTRATED EMBODIMENTS

Figure 1:
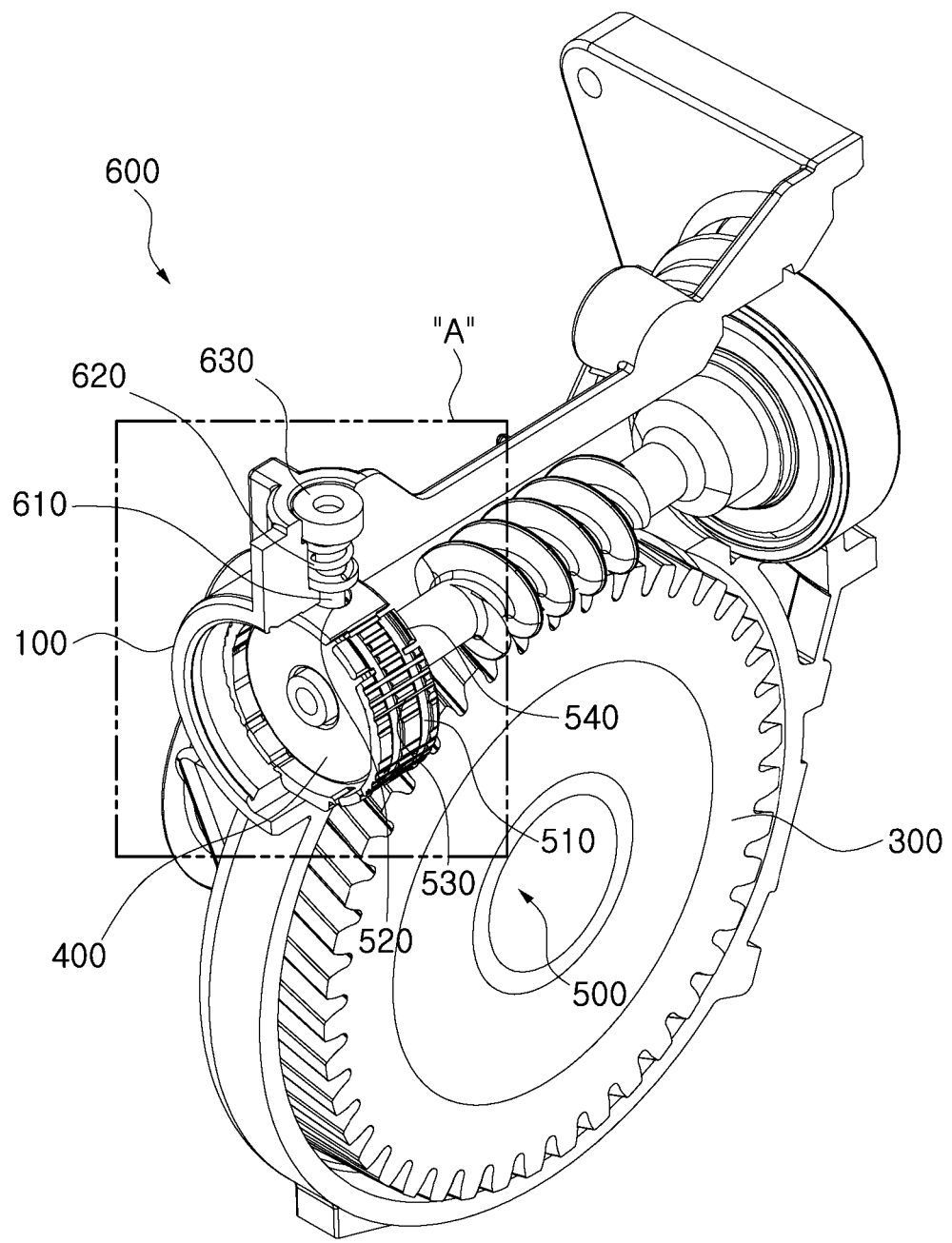
FIG. 1 is a perspective view schematically illustrating a vehicle steering apparatus according to an embodiment of the present disclosure.

Hereinafter, a vehicle steering apparatus according to an embodiment of the present disclosure will be described below with reference to the accompanying drawings. Here, thicknesses of lines illustrated in the drawings, sizes of constituent elements, or the like may be exaggerated for clarity and convenience of description.

In addition, terms used below are defined in consideration of the functions thereof in the present disclosure and may vary depending on the intention of a user or an operator or usual practice. Therefore, the definition of the terms should be made based on the entire contents of the present specification.

Figure 2:
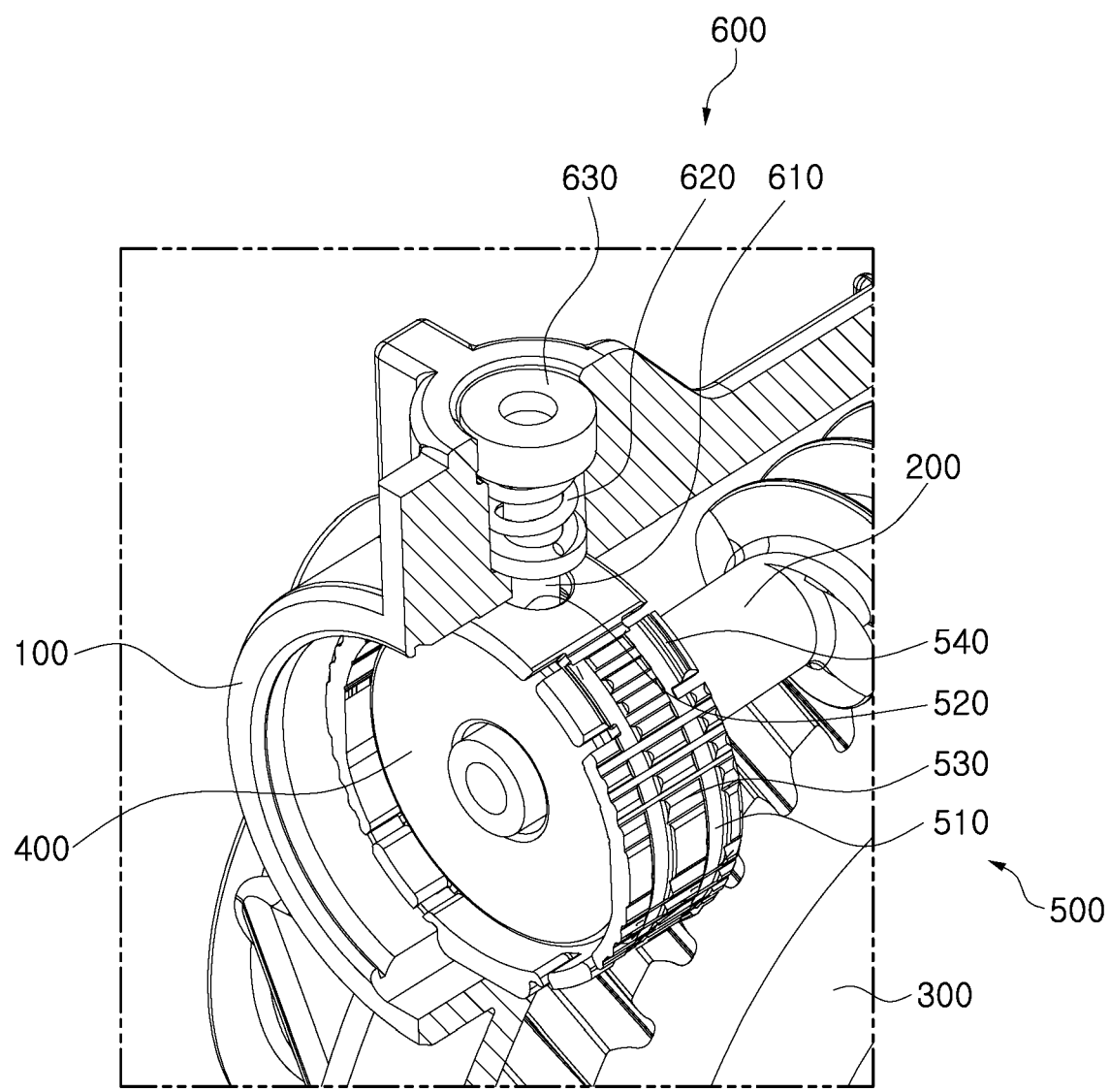
FIG. 2 is an enlarged perspective view schematically illustrating the part "A" in FIG. 1.
Figure 3:
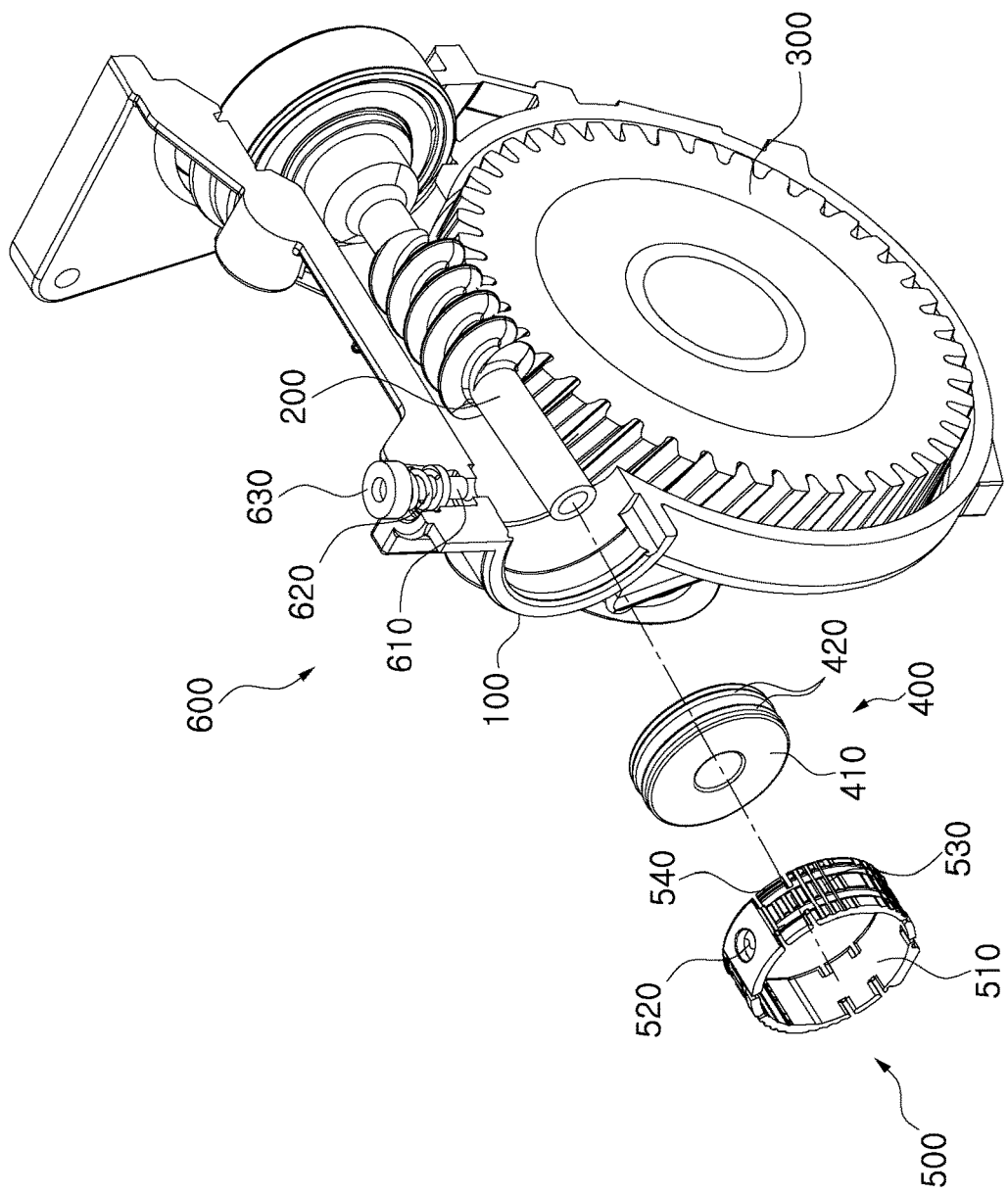
FIG. 3 is an assembled perspective view schematically illustrating the vehicle steering apparatus according to an embodiment of the present disclosure.
Figure 4:
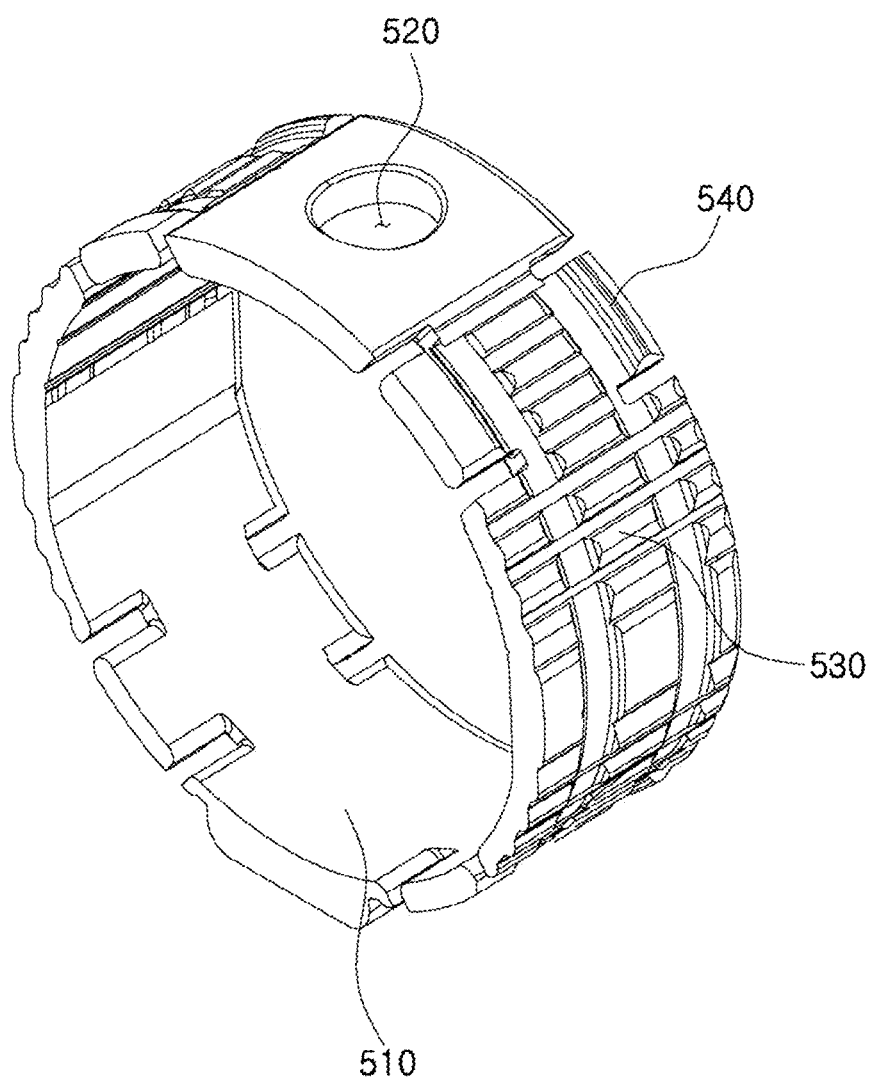
FIG. 4 is a perspective view schematically illustrating the guide according to an embodiment of the present disclosure.
Figure 5:
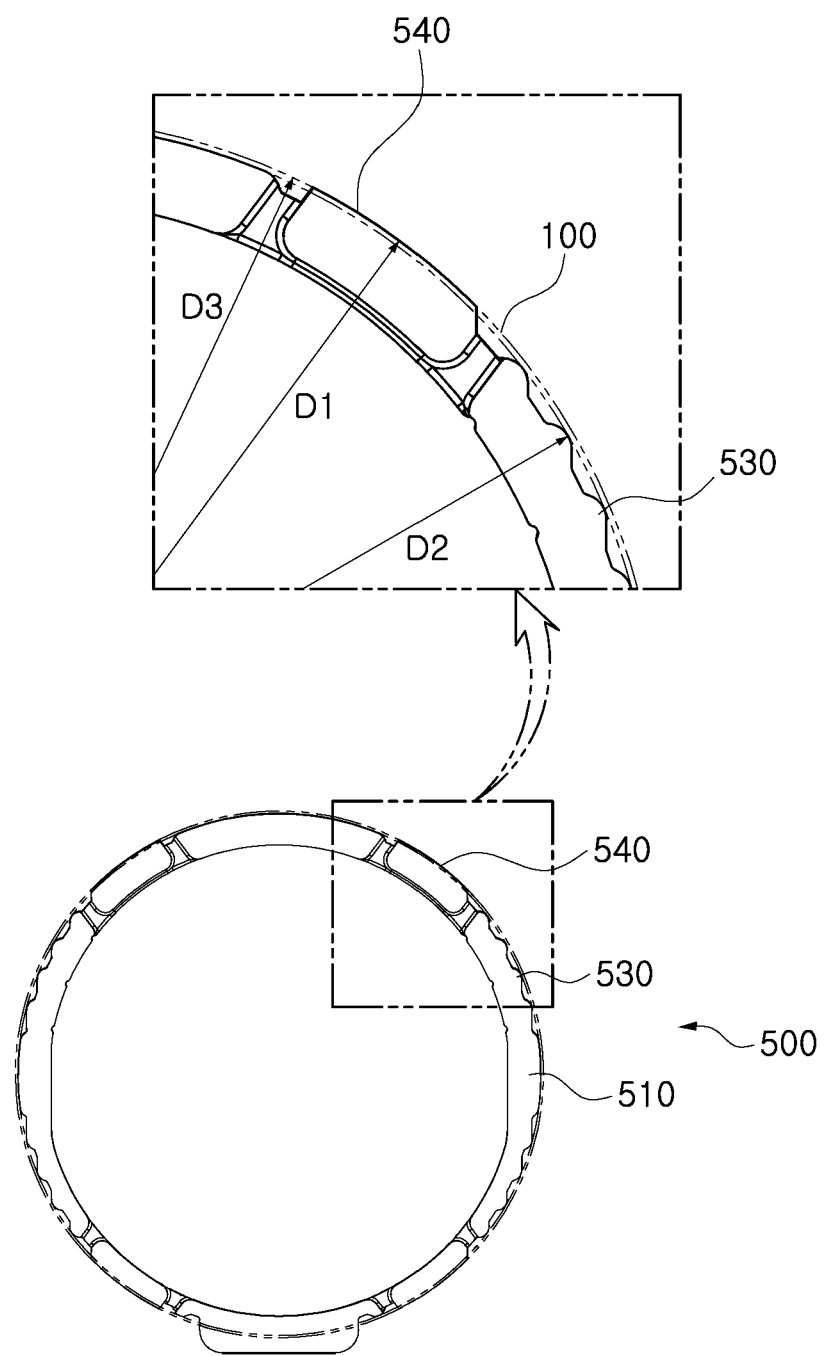
FIG. 5 is a front view schematically illustrating the guide according to an embodiment of the present disclosure.
Figure 6:
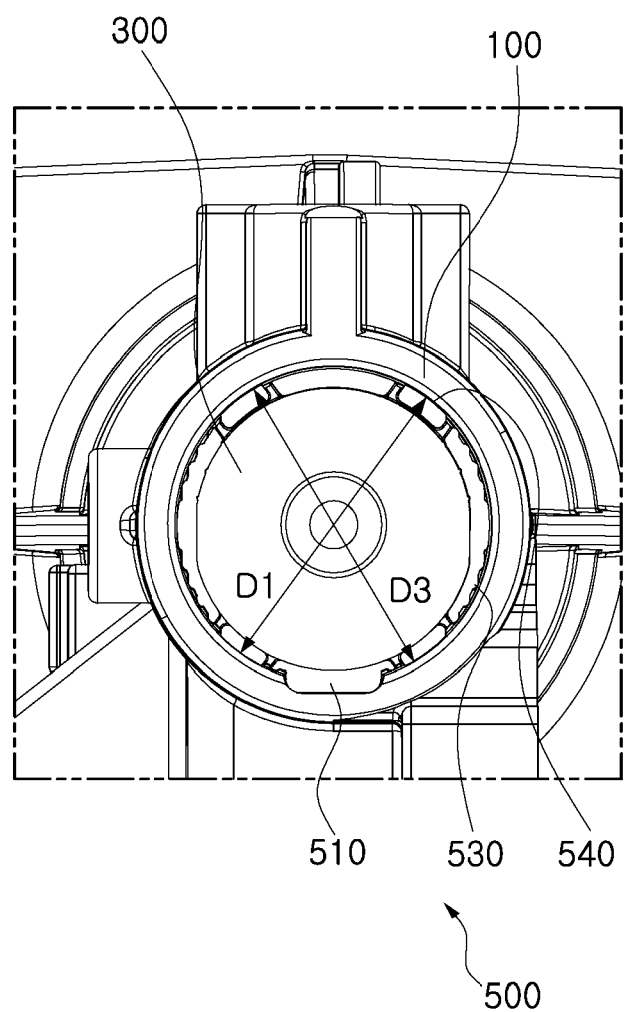
FIG. 6 is a front view schematically illustrating the vehicle steering apparatus according to an embodiment of the present disclosure.

FIG. 1 is a perspective view schematically illustrating a vehicle steering apparatus according to an embodiment of the present disclosure, FIG. 2 is an enlarged perspective view schematically illustrating the part "A" in FIG. 1, FIG. 3 is an assembled perspective view schematically illustrating the vehicle steering apparatus according to an embodiment of the present disclosure, FIG. 4 is a perspective view schematically illustrating the guide according to an embodiment of the present disclosure, FIG. 5 is a front view schematically illustrating the guide according to an embodiment of the present disclosure, and FIG. 6 is a front view schematically illustrating the vehicle steering apparatus according to an embodiment of the present disclosure.

Referring to FIGS. 1 to 6, the vehicle steering apparatus according to an embodiment of the present disclosure may include a main housing 100, a worm shaft 200, a worm wheel 300, a bearing 400, a guide 500, and a pressing part 600.

The main housing 100 may accommodate the worm shaft 200 in the inner space such that the worm shaft 200 is rotatable. In addition, the main housing 100 may accommodate the worm wheel 300 in the lower portion such that the worm wheel 300 is rotatable. The guide 500 surrounding the outer surface of the bearing 400 disposed on one end of the worm shaft 200 may be disposed on one side of the main housing 100 (i.e., the left side in FIG. 1).

The worm shaft 200 may be rotatably disposed on the main housing 100. The worm shaft 200 may rotate while meshed with the worm wheel 300. The worm shaft 200 configured to rotate while meshed with the worm wheel 300 is shaft-connected to a motor (not shown). The motor is connected to one side of the worm shaft 200 (i.e., the right side in FIG. 1), and the ring-shaped bearing 400 is disposed on the other side of the worm shaft 200 (i.e., the left side in FIG. 1).

The ring-shaped bearing 400 is disposed in a shape surrounding an outer portion of one end of the worm shaft 200 (i.e., the left end in FIG. 1), and serves to reduce friction generated during rotation of the worm shaft 200.

The worm wheel 300 is rotatably disposed on the main housing 100 and meshed with the worm shaft 200.

The bearing 400 includes a bearing body 410 and O-ring portions 420. The bearing body 410 is disposed on one end of the worm shaft 200 (i.e., the left end in FIG. 1), and may tilt depending on the inner shape of the guide 500.

The bearing body 410 has the shape of a ring and is disposed in a shape surrounding an outer portion of the worm shaft 200. The bearing body 410 serves to reduce friction generated during rotation of the worm shaft 200. Grooves into which the O-ring portions 420 are fitted are formed in the outer surface of the bearing body 410.

The O-ring portions 420 are fitted to the bearing body 410, and are composed of an elastically-deformable material. The O-ring portions 420 are fitted into the grooves of the bearing body 410. The O-ring portions 420 absorb the shock of the bearing body 410 tilted up and down by the worm shaft 200.

The O-ring portions 420 are composed of an elastically-deformable material, and are configured to be tilted up and down to be elastically deformed when in contact with a pressing rod 610 of the pressing part 600. In the present disclosure, the O-ring portions 420 are composed of an elastically-deformable material such as rubber or silicone.

A plurality of O-ring portions 420 are disposed on the outer surface of the bearing body 410 to be spaced apart from each other predetermined distances. As the plurality of O-ring portions 420 are disposed on the outer surface of the bearing body 410 to be spaced apart predetermined distances from each other, it is possible to cover a range of shocks applied to the outer surface of the bearing body 410 using a smaller number of O-ring portions 420.

In the present disclosure, a plurality of O-ring portions 420 are disposed in the longitudinal direction of the worm shaft 200 to be spaced apart from each other predetermined distances. A plurality of grooves are formed in the outer surface of the bearing 41 in the longitudinal direction of the worm shaft 200 such that the O-ring portions 420 are disposed in the plurality of grooves.

The guide 500 surrounds the outer surface of the bearing 400, and is disposed on the inner surface of the main housing 100 such that the guide 500 is elastically deformable. The guide 500 guides upward and downward tilting of the bearing 400. The guide 500 is composed of an elastically-deformable material, and is elastically deformable by contact with the inner surface of the main housing 100.

The guide 500 surrounds the outer surface of the bearing 400 and is in contact with the inner surface of the main housing 100. With this configuration, the guide 500 may prevent direct contact and connection between the bearing 400 and the main housing 100.

The guide 500 surrounds the outer surface of the bearing body 410 and guides the upward and downward tilting of the bearing body 410. Thus, as the guide 500 guides the worm shaft 200 to be tilted up and down to be in contact with the worm wheel 300, there is no change in the shape of the main housing 100. As a result, manufacturing costs may be reduced, and quality management may be easily performed.

The guide 500 may be composed of a plastic material. Since the guide 500 is composed of a plastic material, the manufacture of the guide 500 may be facilitated to reduce manufacturing time and improve productivity. The guide 500 may include a guide body 510, guide protrusions 530, and stepped protrusions 540 each of which may be composed of an elastically-deformable plastic material.

Referring to FIGS. 4 to 6, the guide 500 may include the guide body 510, a through-hole 520, and the guide protrusions 530.

The guide body 510 is provided in the shape of a ring surrounding the outer surface of the bearing 400, and may guide the tilting of the bearing 400. The inner surface of the guide body 510 is in contact with the bearing body 410.

The bearing body 410 disposed on the inner side of the worm shaft 200 may be tilted up and down depending on the shape of the guide body 510. As the guide body 510 guides the worm shaft 200 to be tilted up and down to be in contact with the worm wheel 300, there is no change in the shape of the main housing 100. As a result, manufacturing costs may be reduced, and quality management may be easily performed.

The guide body 510 is composed of a plastic material. Since the guide body 510 is composed of a plastic material, the manufacture of the guide body 510 into the above-described shape may be facilitated to reduce manufacturing time and improve productivity.

The through-hole 520 is formed in the guide body 510 and allows the pressing part 600 to be inserted thereinto. The pressing rod 610 of the pressing part 600 is inserted into the through-hole 520. The inner diameter of the through-hole 520 is set to be greater than the outer diameter of the pressing rod 610 of the pressing part 600.

A plurality of guide protrusions 530 may protrude from the outer surface of the guide body 510 in the circumferential direction of the guide body 510 and may be in contact with the inner surface of the main housing 100.

The guide protrusions 530 have the shape of protrusions protruding from the outer surface of the guide body 510. The guide protrusions 530 may be elastically deformed by contact with the inner surface of the main housing 100.

In a case in which the guide 500 is to be interference-fitted to the main housing 100, i.e., when the guide protrusions 530 of the guide 500 are press-fitted to the main housing 100, the maximum outer diameter D2 of the guide protrusions 530 is set to be greater than the inner diameter D3 of the main housing 100. Thus, the guide protrusions 530 may be elastically deformed by contact with the inner surface of the main housing 100.

Since the guide protrusions 530 are in contact with the inner surface of the main housing 100, deformation of the guide 500 is limited to the guide protrusions 530 in contact with the inner surface of the main housing 100. Thus, the deformation of the guide body 510 may be minimized compared to a case in which the guide body 510 is in direct contact with the main housing 100.

Since the guide protrusions 530 protruding from the guide body 510 are in contact with the inner surface of the main housing 100, the contact area is reduced and thus friction is also reduced compared to the case of the guide body 510, thereby facilitating insertion. The plurality of elastically-deformed guide protrusions 530 may be firmly supported on the inner surface of the main housing 100 by surface contact with the inner surface of the main housing 100.

The guide protrusions 530, as well as the stepped protrusions 540 to be described later, are in contact with the inner surface of the main housing 100, and thus the guide 500 may be firmly supported on the inner surface of the main housing 100.

In the present disclosure, the guide 500 may further include the stepped protrusions 540. The stepped protrusion 540 may be disposed on the guide body 510 to be spaced apart from the guide protrusions 530 and may be in contact with the inner surface of the main housing 100.

The stepped protrusions 540 may protrude from edge portions of the guide body 510. The stepped protrusions 540 may be formed on the guide body 510 to protrude farther toward the inner surface of the main housing 100 than the guide protrusions 530.

One end of each of the stepped protrusions 540 is fixed to the edge portion of the guide body 510 and the other end of each of the stepped protrusions 540 forms a free end. The stepped protrusions 540 may be bent by contact with the inner side of the main housing 100 so as to provide bending force as elastic restorative force.

A plurality of stepped protrusions 540 may be disposed on the guide body 510 in the circumferential direction of the guide body 510 to be spaced apart from each other predetermined distances. The stepped protrusions 540 may be formed on the edge portions of the guide body 510 to be spaced apart from each other predetermined distances. Although four stepped protrusions 540 are illustrated as being formed on the edge portions of the guide body 510, the present disclosure is not limited thereto.

The maximum outer diameter D1 of the stepped protrusions 540 may be set to be greater than the inner diameter D3 of the main housing 100. In a case in which the guide 500 is to be interference-fitted to the main housing 100, the stepped protrusions 540 may be in contact with the inner surface of the main housing 100 while being elastically deformed together with the guide protrusions 530. The stepped protrusions 540, as well as the guide protrusions 530, may be firmly supported on the main housing 100 by contact with the inner surface of the main housing 100

In a case in which the guide 500 is to be loosely fitted to the main housing 100, i.e., when the guide protrusions 530 of the guide 500 are not in contact with the inner surface of the main housing 100 or are in partial and insufficient contact with the inner surface of the main housing 100 due to the large inner diameter D3 of the main housing 100, the maximum outer diameter D1 of the stepped protrusions 540 formed on the outer circumferential surface of the guide body 510 may be set to be greater than the inner diameter D3 of the main housing 100. Thus, even when the guide protrusions 530 are not in contact with or are in insufficient contact with the inner surface of the main housing 100, the stepped protrusions 540 may be bent by contact with the inner surface of the main housing 100. The stepped protrusions 540 in contact with the inner surface of the main housing 100 in this manner may prevent movement within the main housing 100.

The pressing part 600 may extend through the through-hole 520 of the guide 500 to be in contact with the bearing 400 so as to elastically press the worm shaft 200 toward the worm wheel 300. The pressing part 600 may adjust the degree by which the worm shaft 200 is elastically pressed toward the worm wheel 300.

The pressing part 600 includes the pressing rod 610, a spring 620, and a pressure control portion 630. The pressing rod 610 extends through the through-hole 520 to press the bearing body 410. The pressing rod 610 has the shape of a cylinder extending through the through-hole 520, and has a protrusion protruding from the outer surface to allow the spring 620 to be mounted thereon.

The spring 620 elastically supports the pressing rod 610. One side of the spring 620 (i.e., the lower side in FIG. 3) is in contact with the protrusion of the pressing rod 610 and the other side of the spring 620 (i.e., the upper side in FIG. 3) is in contact with the pressure control portion 630. The spring 620 is implemented as a coil spring surrounding the outer surface of the pressing rod 610. The spring 620 adjusts elasticity by which the pressing rod 610 presses the bearing body 410 in response to the movement of the pressure control portion 630.

The pressure control portion 630 is movably disposed on the main housing 100 and is in contact with the spring 620. The pressure control portion 630 is screw-fastened to the main housing 100. The pressure control portion 630 presses the spring 620 while being moved up and down in the main housing 100, thereby adjusting elasticity by which the pressing rod 610 presses the bearing body 410.

In the vehicle steering apparatus according to the present disclosure, the guide 500 may be reliably fitted to the main housing 100 to absorb vibrations of the bearing 400, thereby reducing noise and vibrations.

In addition, according to the present disclosure, when the guide 500 is the same as or greater than the inner diameter of the main housing 100 due to the guide protrusions 530 or the stepped protrusions 540, it is possible to absorb the tolerance distribution, thereby realizing a reliable function.

Although the present disclosure has been described with reference to the embodiments depicted in the drawings, the embodiments are for illustrative purposes only, and those skilled in the art to which the present technology pertains will understand that various modifications of the embodiments and any other embodiments equivalent thereto are available. Accordingly, the true technical protection scope of the present disclosure should be determined by the appended claims.

What is claimed is:

1. A vehicle steering apparatus, comprising:
   a main housing;
   a worm shaft rotatably disposed on the main housing;
   a worm wheel meshed with the worm shaft;
   a bearing disposed on the worm shaft;
   an elastically deformable guide surrounding an outer surface of the bearing and disposed within the main housing; and
   a pressing part extending through the elastically deformable guide to be in contact with the bearing and configured to press the worm shaft toward the worm wheel,
   wherein the elastically deformable guide comprises:
   a guide body disposed within the main housing and surrounding the outer surface of the bearing;
   a through-hole extending through the guide body and allowing the pressing part to be inserted thereinto;
   a plurality of guide protrusions protruding from the guide body in a circumferential direction of the guide body to be in contact with an inner surface of the main housing; and
   stepped protrusions disposed on the guide body to be spaced apart from the guide protrusions and in contact with the inner surface of the main housing,
   wherein a maximum outer diameter of the stepped protrusions is greater than an inner diameter of the main housing.

2. The vehicle steering apparatus according to claim 1, wherein the guide protrusions are elastically deformed by contact with the inner surface of the main housing.

3. The vehicle steering apparatus according to claim 1, wherein one end of each of the guide protrusions is in contact with an edge portion of the guide body.

4. The vehicle steering apparatus according to claim 1, wherein the plurality of stepped protrusions are disposed on the guide body in a circumferential direction of the guide body to be spaced apart from each other predetermined distances.

5. The vehicle steering apparatus according to claim 1, wherein the pressing part comprises:
   a pressing rod extending through the through-hole to press the bearing;
   a spring configured to elastically support the pressing rod; and
   a pressure control portion movably disposed on the main housing and in contact with the spring.

6. The vehicle steering apparatus according to claim 1, wherein the guide body is ring-shaped.

7. The vehicle steering apparatus according to claim 1, wherein the elastically deformable guide comprises a plastic material.

8. The vehicle steering apparatus according to claim 1, wherein the bearing comprises:
   a bearing body disposed on one end of the worm shaft and disposed within the guide body; and
   O-ring portions disposed on an outer surface of the bearing body and comprising an elastically-deformable material.

9. The vehicle steering apparatus according to claim 8, wherein the plurality of O-ring portions are disposed on an outer surface of the bearing body to be spaced apart from each other.

* * * * *